US008697232B2

(12) United States Patent
Schäfer

(10) Patent No.: US 8,697,232 B2
(45) Date of Patent: Apr. 15, 2014

(54) PRESSURELESS EXPANSION BY MEANS OF SUPERHEATED STEAM

(75) Inventor: Philipp Schäfer, Hannover (DE)

(73) Assignee: LANXESS Deutschland GmbH, Cologne (DE)

( * ) Notice: Subject to any disclaimer, the term of this patent is extended or adjusted under 35 U.S.C. 154(b) by 880 days.

(21) Appl. No.: 12/279,191

(22) PCT Filed: Mar. 14, 2006

(86) PCT No.: PCT/EP2006/002335
§ 371 (c)(1), (2), (4) Date: Oct. 30, 2008

(87) PCT Pub. No.: WO2007/095970
PCT Pub. Date: Aug. 30, 2007

(65) Prior Publication Data

US 2010/0021722 A1 Jan. 28, 2010

(30) Foreign Application Priority Data

Feb. 20, 2006 (AT) ..................................... 126/2006

(51) Int. Cl.
*B32B 5/16* (2006.01)
*B05D 1/00* (2006.01)
*B05D 3/04* (2006.01)
*B05C 11/02* (2006.01)
*B05C 11/00* (2006.01)

(52) U.S. Cl.
USPC ............. 428/327; 427/209; 427/335; 118/56; 118/66

(58) Field of Classification Search
None
See application file for complete search history.

(56) References Cited

U.S. PATENT DOCUMENTS

| | | | | |
|---|---|---|---|---|
| 4,016,326 | A * | 4/1977 | Schaefer | 428/313.5 |
| 4,740,407 | A * | 4/1988 | Schaefer et al. | 428/87 |
| 4,874,449 | A * | 10/1989 | Schaefer et al. | 156/246 |
| 5,368,609 | A * | 11/1994 | Inoue | 8/94.22 |
| 6,290,809 | B1 * | 9/2001 | Bielfeldt et al. | 156/380.9 |
| 2007/0074352 | A1 * | 4/2007 | Schafer | 8/94.15 |

FOREIGN PATENT DOCUMENTS

| | | |
|---|---|---|
| EP | 1279746 | * 12/2001 |
| WO | WO 2005/040431 | * 5/2005 |

* cited by examiner

*Primary Examiner* — Sheeba Ahmed
(74) *Attorney, Agent, or Firm* — Nicanor A. Kohncke

(57) ABSTRACT

In order to provide an economical process for applying a coating to at least one side, optionally to both sides, of a leather, in which gentle processing of the leather is ensured and hardening thereof is avoided, an aqueous plastic dispersion having compact particles containing a blowing agent being applied to this side or these sides and being allowed to solidify, and hollow microspheres being formed from the thermoplastic compact particles by supplying heat, the invention proposes that, after solidification, the plastic dispersion containing the compact particles is subjected to the action of expanded superheated steam at a temperature between 80° C. and 100° C. (FIG. 2).

13 Claims, 5 Drawing Sheets

1
2
3
4
5
6
7

2
3
5
5'
6
6'
7
8
9
10

PRESSURELESS EXPANSION BY MEANS OF SUPERHEATED STEAM

BACKGROUND OF THE INVENTION

The invention relates to a process and an apparatus for applying a coating, preferably a bottom coating, to at least one side, optionally to both sides, of a leather, namely to the grain side and/or to the flesh side of a grain leather opposite this grain side, or to one or both sides of a split leather, and a leather produced by such a process and provided with a coating, preferably a bottom coating.

It is already known that the visible side of a leather can be provided with a dressing. An aqueous plastic dispersion is applied to the leather thereby and is allowed to solidify by supplying heat. It is known that the prepared hollow microspheres can be mixed with this aqueous plastic dispersion for the formation of a foam structure. It has also already been proposed to add to the aqueous plastic dispersion compact particles which contain a blowing agent and from which hollow microspheres are subsequently formed by application of pressure and heat in the solidified plastic dispersion.

It has also already been proposed to provide the back opposite the visible side of the leather with a foam coating which consists of a solidified plastic dispersion containing hollow microspheres. Thus, AT 005281 U1 discloses a leather in which the thick foam coating provided on the back is formed from an aqueous plastic dispersion which, on application, contains both prepared hollow microspheres and compact particles from which hollow microspheres are formed by supplying heat. This thick foam coating has a cushioning function; it has more than 10% of open cells and cannot be used as the bottom coating.

AT 006040 U1 has disclosed a leather and a process for the production hereof, in which the back of the leather opposite the visible side is provided with a foam finish which is formed by solidification of a plastic material applied in liquid form and containing prepared hollow microspheres by the brief action of hot air. The hot air has a temperature of more than 280° C., preferably a temperature between 350° C. and 650° C. and is therefore very hot and dry, which leads to the natural moisture being extracted from the leather and to the latter shrinking and hardening. Furthermore, owing to the considerable action of heat, the hollow microspheres in the uppermost region of the foam finish are frequently destroyed. This coating cannot be used as the bottom coating for building up further dressings.

DE 20318311 U1 discloses a full-grain leather in which defects in the grain layer are corrected by a plastic filling material which consists of a solidified plastic dispersion containing hollow microspheres formed from compact particles by supplying heat. The formation of the hollow microspheres is effected by application of pressure and heat at a temperature of at least 100° C. This known formation, too, has the disadvantage that the leather is adversely affected at the required pressure and the temperature used. In particular, however, the defects formed by indentations are completely filled by the plastic filling material in this formation since the leather which is resilient under pressure recovers after a pressure relief, whereas the plastic filling material experiences no increase in volume, and hence the plastic filling material remains recessed at its top relative to the leather surface. In order to achieve a completely level surface, it is therefore necessary to buff the grain side of the leather to such a depth that the entire surface is level, with the result that the quality of the leather is adversely affected and it is considerably reduced in value. Moreover, the temperature increase required for the expansion of the compact particles for the formation of the hollow microspheres does not take place in the lower regions of the indentations in the grain layer on economically acceptable application of pressure and heat, so that this lower region has no hollow microspheres or only a small number thereof. With the use of higher temperatures over a longer period, hollow microspheres do form in this region but the leather is compacted even more, which leads to further hardening. Moreover, the loose-grained character is fully restored after subsequent drumming of the leather hide, especially in the belly region of a cattle hide.

Repairing of grain damage is also attempted by the so-called stucco method. In this process, a plastic dispersion which can be applied with a spatula and often also contains prepared hollow microspheres is applied manually or mechanically to the leather. On drying, the material shrinks by its proportion of water. The filled areas are thus deeper and for this reason too the grain side has to be subsequently buffed.

Both those processes in which the hollow microspheres are formed from compact particles by means of heat and pressure in the solidified plastic dispersion and those processes in which the hollow microspheres are formed by means of infrared radiation or very hot air have disadvantages and are not suitable for the production of a bottom coating. If hot air is used for supplying heat for the formation of the hollow microspheres, hollow microspheres rapidly form at the surface of the solidified plastic dispersion; they form there a heat-insulating layer and prevent the heat from penetrating to a sufficient degree into the deeper zones in order to form hollow microspheres from the compact particles there too. If, in order to avoid this disadvantage, the temperature of the hot air is increased, the already formed hollow microspheres on the surface of the solidified plastic dispersion are destroyed thereby and the leather hardens and shrinks. Similar behaviour is encountered with the use of infrared radiation.

It was therefore the object of the present invention to avoid the disadvantages of known leathers provided with a foam coating and to provide a leather which has a foam coating applied to at least one side, optionally to both sides, which can be produced in an economical manner, in which shrinkage and hardening during the formation of the foam coating are avoided and in which defects at the surface of the leather can be eliminated without an existing grain structure being damaged by subsequent processing of the top. Furthermore, it is the object of the invention to provide a leather which eliminates or at least considerably reduces the loose-grained character which is always present in the case of the soft full-grain cattle leather, especially in the belly region, and which is provided with a bottom coating which is also firmly bonded to the full grain side of the leather and has a surface on which finish layers can be applied without problems by any desired method, these finish layers forming a close and firm bond to the bottom coating.

BRIEF SUMMARY OF THE INVENTION

For achieving this object, it is proposed in the process according to the invention for the production of such a leather that, in a known production of the coating by application of an aqueous plastic dispersion having compact particles containing a blowing agent and subsequent solidification thereof, according to the invention the hollow microspheres are formed from the thermoplastic compact particles by subjecting the plastic dispersion containing the compact particles, after its solidification, to the action of expanded superheated steam at a temperature between 80° C. and 100° C. The pressure acting on the plastic dispersion here is preferably less than 0.1 bar. Optimum values are achieved if the superheated steam acts on the solidified plastic dispersion in a period of less than 7 seconds, preferably of less than 3 seconds. It has been found that such expanded superheated steam, if it comes into contact with the solidified plastic dispersion at atmospheric pressure or virtually atmospheric pressure, spontaneously brings about the formation of the hollow microspheres from the compact particles without the properties of the leather being adversely affected thereby and, since the steam contains moisture, no moisture is extracted from the leather in this procedure but rather is supplied, with the result that hardening and shrinkage of the leather are prevented. In addition to its heating effect, the superheated steam, as a vapour, also has a plasticizing effect on the solidified plastic dispersion because of the moisture, with the result that the hollow microspheres can form rapidly and optimally therein and destruction of the shell thereof is avoided. The hollow microspheres thus formed also have a better formation than those which form by application of pressure and heat, by infrared radiation or by hot air treatment in the known processes, and are not destroyed especially with the use of superheated steam.

An economical use of the process according to the invention on achieving optimum values is achieved when superheated steam present is allowed to act on the leather provided with the solidified plastic dispersion. However, it is also possible to spray a small amount of warn or cold water onto the solidified plastic dispersion and to allow it to vaporize by supplying heat for the formation of the superheated steam. In this case, however, the energy consumption is greater and the result poorer.

In the process according to the invention, thermoplastic and/or thermoelastic plastic dispersions which contain compact particles having a blowing agent are used. These compact particles consist in a known manner of a thermoplastic or plastic copolymer, preferably of polyvinylidene chloride copolymer, contain for example isobutane as a blowing agent and have a size of less than 20 μm, preferably less than 10 μm. When used in a plastic dispersion which preferably contains a wetting agent and/or density-increasing additives, such as barite, they easily penetrate into the indentations at the leather surface. Soft plastic dispersions having a hardness of less than 70 Shore A, which become even softer as a result of the action of superheated steam, are particularly suitable. The preferred viscosity of the plastic dispersion is in the range between 5 sec and 15 sec, measured in a Ford cup having an nozzle diameter of 6 mm, in particular if said plastic dispersion is applied to the leather using a spray apparatus or by a so-called plush pad. If the plastic dispersion is applied to the leather by means of a roll rotating in the direction opposite to the transfer direction of said leather in order to promote the penetration of the plastic dispersion into the indentations of the leather surface, the viscosity is between 10 and 40 sec, measured in the Ford cup having a diameter of 6 mm.

In addition to its heating, the superheated steam used, as vapour, also has a plasticizing effect on such compact particles, so that the hollow microspheres forming therefrom also adapt to small indentations in the leather surface and can form there in the short period mentioned.

A substantial advantage of using the process according to the invention is that the leather does not have to be subjected to a pressure load for the formation of the hollow microspheres from the compact particles, i.e. it retains its original thickness, so that complete filling of indentations in the leather surface is ensured and no subsequent processing by the partial removal of the grain layer is required for achieving a planar surface.

The use of the process according to the invention also has the economical advantage that most leather factories in any case have high-pressure steam generators and are therefore also able to produce low-pressure steam.

For the formation of a coating on one side of a leather, apparatuses are already known by means of which an aqueous plastic dispersion having compact particles containing blowing agent is applied to this side. The application is effected here in thin layers between 0.015 mm and 0.08 mm, either by means of rolls which rotate in the direction opposite to the transport direction of the leather, or preferably by spraying on, because the low-viscosity plastic dispersion then penetrates better even into fine indentations, starting from the leather surface and even deep into the leather. The application can also be effected manually, for example by application with a so-called plush pad. The low-viscosity plastic dispersion penetrates particularly deeply even into the very fine pinholes. After the application of this plastic dispersion, solidification of the aqueous plastic dispersion and expansion of the compact particles arranged therein for the formation of the hollow microspheres are effected by supplying heat. In the apparatus according to the invention, a superheated steam feeding device acting on the solidified plastic dispersion is provided, by means of which hollow microspheres are formed from the compact particles rapidly and with protection of the leather in the manner mentioned.

Expediently, the superheated steam feeding device has at least one superheated steam line having outlet nozzles or outlet slots directed towards the solidified plastic dispersion, from which nozzles or slots the superheated steam is sprayed onto the solidified plastic dispersion. The superheated steam line preferably consists here of a tube having a round or a polygonal cross section, in which the outlet nozzles or outlet slots are provided and which is connected to a superheated steam source. It has proved to be advantageous if this tube is formed as a zigzag shape, the individual sections running transverse to the direction of transport of the leather, and is connected at its two ends to the superheated steam source so that the steam circulates in the tube and hence cooling is prevented. A low stream pressure of less than 5 bar, preferably less than 2 bar, is sufficient here.

However, it is also possible to provide an arrangement in which the superheated steam feeding device consists of a superheated steam container which encloses the transport device and to which superheated steam is fed via a superheated steam source so that the leather present on the transport device and provided with the solidified plastic dispersion is treated with the superheated steam present in the superheated steam container during the further movement in the said container. Here, the superheated steam feeding device is expediently arranged adjacent to a revolving transport device supporting the leather provided with the applied plastic dispersion, so that the leather moving past the superheated steam feeding device is treated continuously with the superheated steam.

The transport device preferably consists of a plurality of parallel, revolving plastic filaments, such as polyamide or polyester filaments, a distance apart. These filaments are heat-resistant, are not destroyed by the superheated steam, in contrast to the use of hot air and of infrared radiation, and provide good support for the leather. In addition, this arrangement has the advantage that spaces are left between the filaments so that it is possible to supply heat not only to the top of the solidified plastic dispersion but through the leather also to the bottom, hence from all sides, which heat reaches the leather via the spaces. This transport device is advantageous especially when the superheated steam feeding device consists, as mentioned, of a superheated steam container enclosing the transport device. However, it is also possible to provide a separate superheated steam feeding device which is arranged below the transport device and via which heat is passed through the leather to the aqueous plastic dispersion having the compact particles.

In order to effect solidification of the plastic dispersion and optionally also subsequent drying thereof after formation of the hollow microspheres, according to a further feature of the invention a hot air channel, which encloses the transport device and in which warm air can reach the leather also through the spaces between the plastic filaments, can be provided in the direction of revolution of the transport device, before and optionally also behind the superheated steam feeding device.

The leather produced by the process according to the invention is characterized in that the coating treated with expanded superheated steam has, on its surface, a homogeneous, nubuck-like, indentation-free appearance, for example like finely buffed grain leather, even has a slight writing effect typical of nubuck and, being observed under the microscopic, has very fine pores having an internal diameter of less than 35 μm. In spite of its softness, such a leather is not or almost not loose-grained. If a finish layer is applied to a bottom coating produced by the processes according to the invention, this leather has an optimum appearance because compression causes the formation of many small creases which have the appearance of high-quality full-grain aniline leather. As a result of the superheated steam treatment, the adhesion of the bottom coating to the leather also improves and, owing to the nubuck-like appearance of the surface for the bottom coating, a subsequently applied finish layer can also be mechanically anchored.

The thin, solidified bottom coating increases its volume after treatment with superheated steam by more than 15%, preferably by more than 25%. As a result, indentations in the leather surface are filled so that they are flat or slightly raised. The nubuck-like surface structure is preferably present over the whole area or virtually over the whole area on the leather surface. Since closed cells formed predominantly by the hollow microspheres are present in the coating, such a leather is suitable in particular for the production of automotive components in which the leather is drawn into moulds and optionally subjected to in-mould foaming.

BRIEF DESCRIPTION OF THE SEVERAL VIEWS OF THE DRAWING(S)

DETAILED DESCRIPTION OF THE INVENTION

Figures 1, 2:
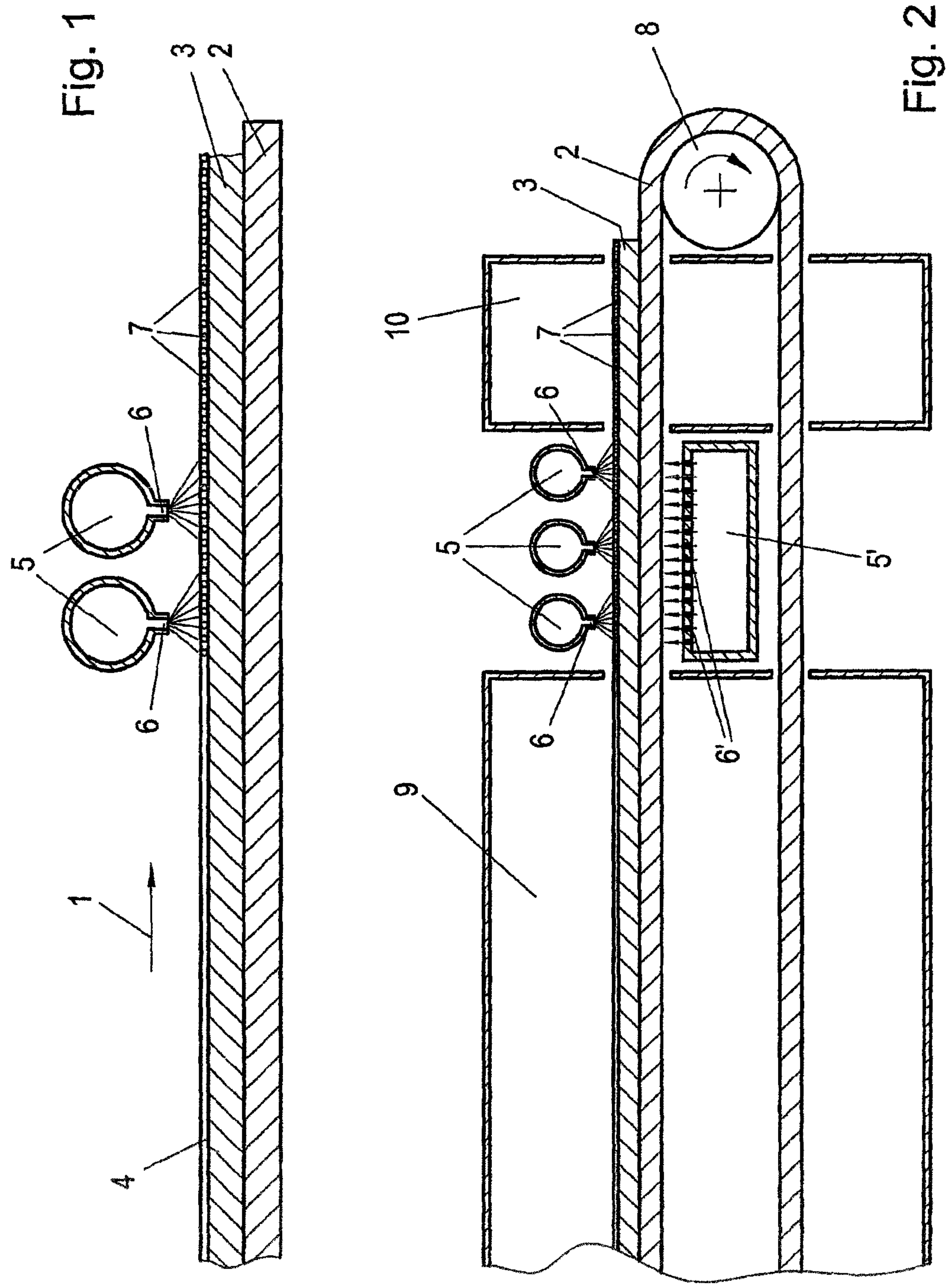
FIG. 1 illustrates an apparatus for employing the process for an embodiment of the present invention.
FIG. 2 is a schematic of the apparatus of FIG. 1.
Figure 3:
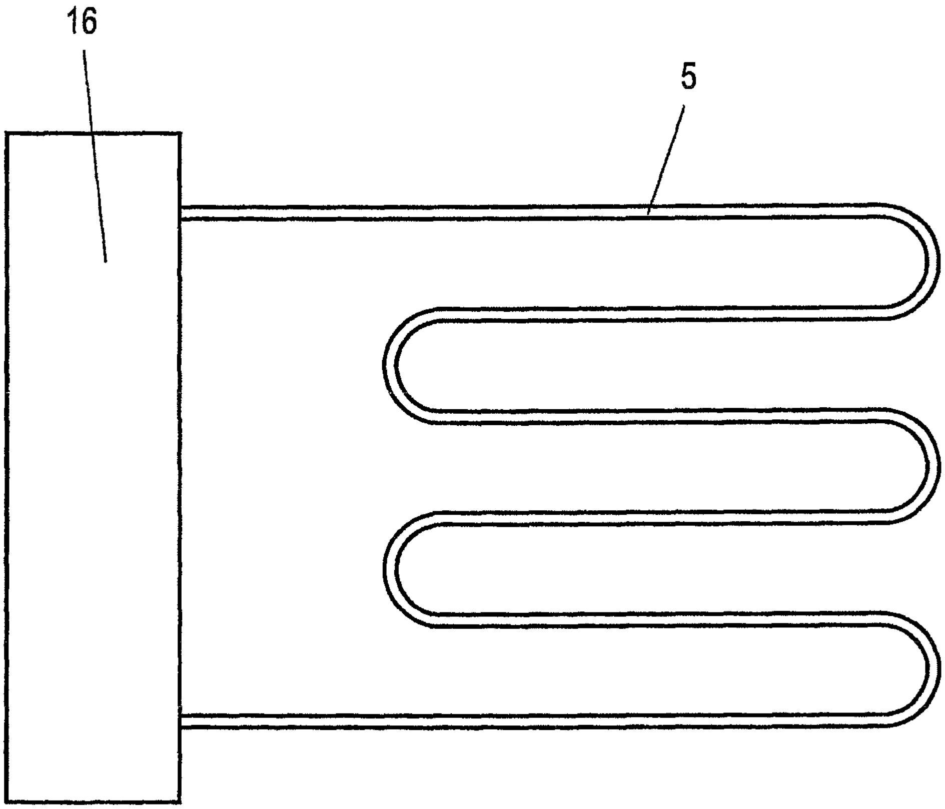
FIG. 3 illustrates an embodiment of a superheated steam feeding device for use in the process of the present invention.
Figure 4:
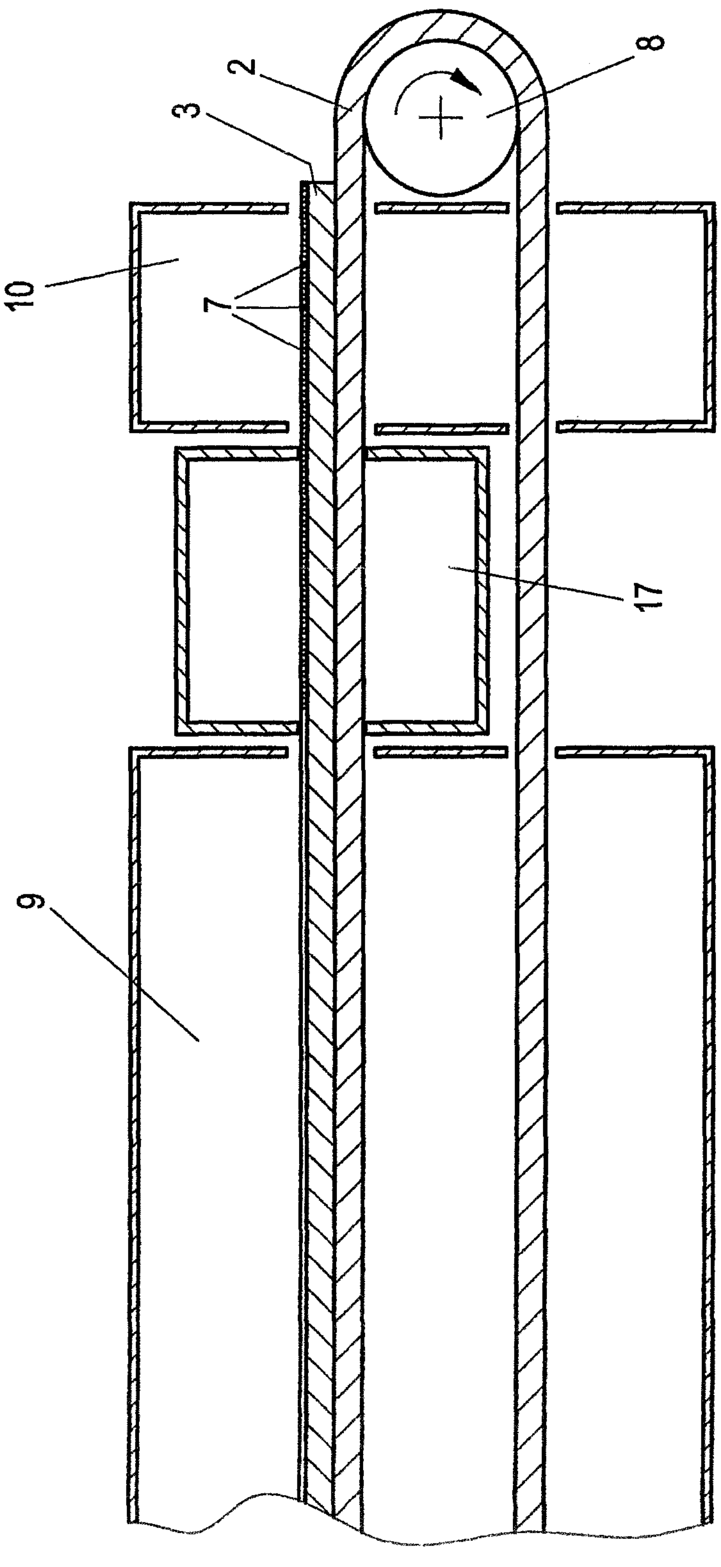
FIG. 4 illustrates a working example of an apparatus for use in the process of the present invention.
Figure 5:
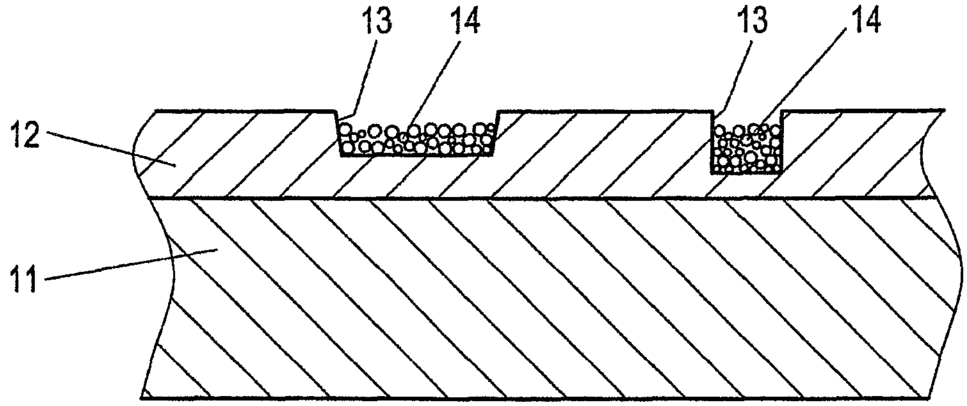
FIG. 5 is a cross-sectional view of leather showing indentations forming defects in the grain layer.
Figure 6:
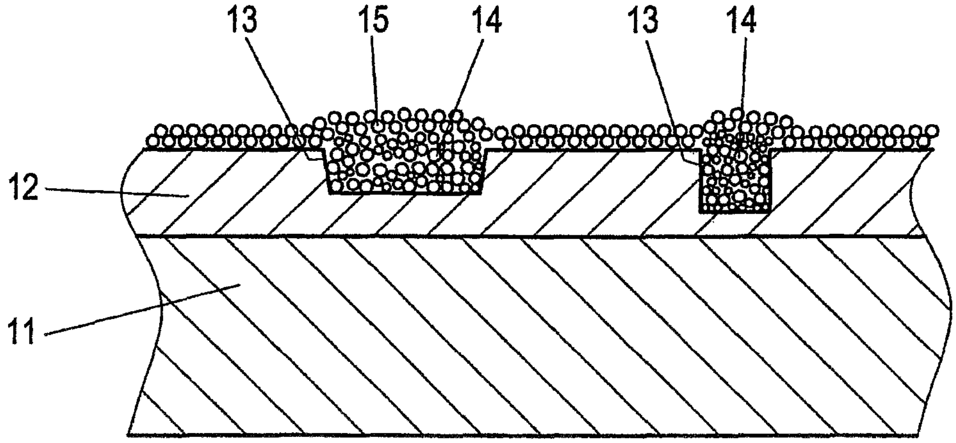
FIG. 6 is a cross-sectional view of the leather of FIG. 5 whose grain layer was treated by the process of the present invention.
Figure 7:
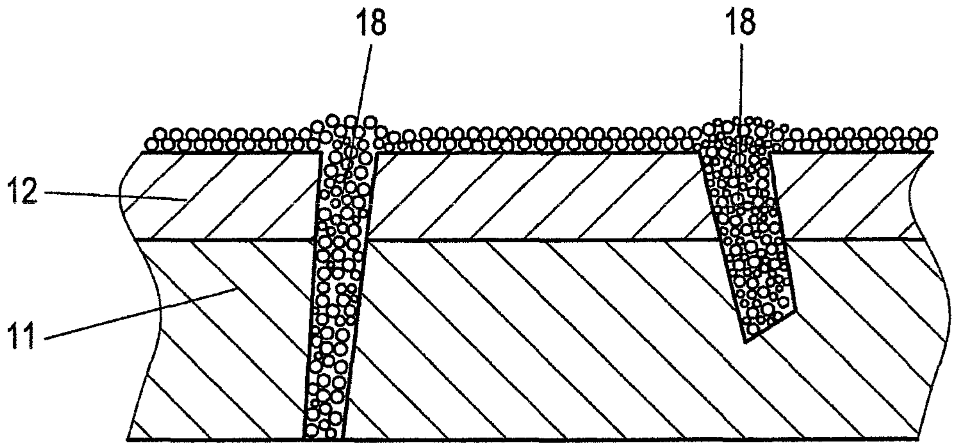
FIG. 7 is a cross-sectional view of leather whose grain layer was treated by the process of the present invention.

The invention is explained in more detail with reference to the drawing. FIG. 1 shows the principle of the apparatus according to the invention and FIG. 2 schematically shows a working example of this apparatus. FIG. 3 shows a particular embodiment of the superheated steam feeding device according to the invention. FIG. 4 shows a further working example of the apparatus according to the invention. FIG. 5 shows a section through a leather in which indentations forming defects in the grain layer are eliminated by a known process, and FIG. 6 shows such a leather whose grain layer was treated by the process according to the invention. FIG. 7 also shows, in section, a leather whose grain layer was treated by the process according to the invention.

A leather 3 is supported on a transport device 2 revolving in the transport direction 1, onto which an aqueous plastic dispersion 4 containing compact particles was applied in a manner known per se and not shown, for example by spraying on or by means of roll coating, preferably by an application roll rotating in a direction opposite to the transport direction 1, said plastic dispersion 4 being solidified by supplying heat, for example by means of warm air. Here, the transport device 2 expediently consists of a plurality of parallel polyamide or polyester filaments a distance apart, between which spaces are left. These filaments are shown on a larger scale in the drawing. In practice, their diameter is less than 4 mm.

A superheated steam feeding device connected to a superheated steam source is provided above the solidified plastic dispersion 4 provided on the leather 3, which superheated steam feeding device consists of tubes 5 having any desired cross section which are provided with outlet nozzles or outlet slots 6 from which expanded superheated steam emerges without pressure or at only low pressure in the direction of the solidified plastic dispersion 4. As a result, hollow microspheres 7 are formed from the compact particles within a very short time when the leather 3 provided with the solidified plastic dispersion moves past, so as to form foam coating which is nubuck-like on its surface and has no skin on the leather, without the properties of the leather being adversely affected thereby. For better visibility, the hollow microspheres are shown on a larger scale. The number of tubes 5 arranged one behind the other in the transport direction 1 depends on the transport speed of the leather 3 and must be chosen so that treatment of the solidified plastic dispersion with expanded superheated steam in the short time span required for the formation of the hollow microspheres is ensured.

The distance between the outlet nozzles or outlet slots 6 and the solidified plastic dispersion 4 must be chosen so that the superheated steam comes into contact with the plastic dispersion at a temperature of at least 80° C.

In the embodiment according to FIG. 2, warm air drying channels 9, 10 in which warm air can also be fed to the underside of the leather 3 via the spaces between the polyamide or polyester filaments are provided before and after the superheated steam feeding device—viewed in the transport direction 1. The complete solidification of the plastic dispersion 4 applied to the leather 3 takes place in the warm air drying channel 9 before the formation of the hollow microspheres 7 from the compact particles takes place in the region of the tubes 5; subsequent drying of the coating already having a foam structure takes place in the warm air drying channel 10. Furthermore, in the embodiment according to FIG. 2, a superheated steam container 5' which has outlet nozzles or outlet slots 6' directed towards the transport direction 2 is provided below the transport device 2. The superheated steam container 5' is connected to a superheated steam source so that superheated steam emerges via the outlet nozzles or outlet slots 6' and reaches the leather 3 via the spaces between the plastic filaments so that formation of the hollow microspheres in the indentations of the grain layer which are filled by the solidified plastic dispersion takes place via the superheated steam passing through this leather, and the solidified plastic dispersion is also foamed from the underside.

Of course, instead of the tubes 5 arranged above the solidified plastic dispersion, it is also possible to provide a superheated steam container 5', and to do so in addition to the superheated steam container 5' below the transport device 1 or without such a superheated steam container below the transport device 1.

FIG. 3 shows a development in which the tubes 5 of the superheated steam feeding device are arranged in a zigzag manner and are connected at the two ends to a superheated steam source 16 in such a way that the superheated steam circulates continuously in the tubes 5 and experiences no cooling so that treatment with superheated steam at a constant temperature takes place because the condensation is converted back into steam. Here, the individual tube sections run transversely to the transport direction 1.

FIG. 4 shows a development according to the invention in which the transport device 2 passes through a superheated steam container 17 which is connected to a superheated steam source or in which the steam is generated from demineralized water so that the superheated steam passes uniformly around the leather with the solidified plastic dispersion situated thereon. Here, the spaces between the plastic filaments permit access of the steam also to the underside of the leather.

The process according to the invention also permits the application of a coating to both sides of a leather, for example for the purpose of correction of defects on the grain side of a grain leather and for application of a foam finish to the back opposite this grain side. In this case, an aqueous plastic dispersion containing compact particles is applied first to one side and then to the other side of the leather and allowed to completely solidify, whereupon the two sides can be subjected, preferably simultaneously, to the action of expanded superheated steam. Superheated steam feeding devices are then provided on both sides of the leather, as shown in FIG. 2, or an arrangement according to FIG. 4 is used so that the formation of the hollow microspheres from the compact particles takes place simultaneously in the solidified plastic dispersion present on both sides of the leather.

FIG. 5 shows, in cross section, a leather having a leather layer 11 and a grain layer 12 which has defects formed by indentations 13. In the case of elimination of these defects by a known process, these indentations 13 are filled with a solidified plastic dispersion 14 which contains hollow microspheres. These hollow microspheres are formed by compact particles present in the plastic dispersion as a result of application of pressure and heat. The leather layer 11, too, is compressed but, after the pressure is relieved, the leather recovers owing to its resilience under pressure, whereas the solidified plastic dispersion 14 present in indentations 13 does not change its volume. As is now evident from FIG. 5, it is for this reason that, with the use of known processes, the indentations 13 in the grain layer 12 are not completely filled after pressure relief, so that, in order to achieve a level surface, it is necessary to buff the grain layer 12 to the height of the solidified plastic dispersion 14 present in the indentations. As a result, the grain layer is damaged and the quality of the leather is considerably reduced.

On the use of the process according to the invention, low pressure is applied to the leather layer 11 and the grain layer 12 for the formation of the hollow microspheres in the solidified plastic dispersion, so that these layers retain their original thickness. As is evident from FIG. 6, the solidified plastic dispersion 14 even has a slight elevation 15 in the indentations 13 after the formation of the hollow microspheres by the action of expanded superheated steam, which elevation can be easily removed by a very fine abrasive paper, preferably having a grade of less than 600/$cm^2$, without the grain layer 12 being damaged. Hot ironing is also possible.

FIG. 7 shows a leather 11 having so-called pinholes 18 in cross section, which extend through the grain layer 12 into the leather layer 11 and in parts even completely pass through this leather layer 11. Such pinholes 18 frequently occur and, depending on the number of these pinholes present, which have a diameter between 0.3 mm and 1.5 mm, the leather hide is of reduced value or worthless. On the use of the process according to the invention, even the pinholes completely passing through the leather layer 11 are closed by the formation of the hollow microparticles in the solidified plastic dispersion if the plastic dispersion containing the compact particles is applied to the grain layer 12 so that this plastic dispersion penetrates at least partly into the pinholes 18 and if, after solidification of the plastic dispersion, the leather is treated from the underside with superheated steam and, optionally simultaneously, before and afterwards, the solidified plastic dispersion applied to the grain layer 12 is treated with superheated steam. As a result of the steam treatment from the underside of the leather, it is not only ensured that the pinholes 18 are completely closed but also any loose-grain character of the leather is eliminated.

In order to ensure complete closing of the pinholes, a plastic dispersion having a viscosity of less than 10 sec, measured in a Ford cup having a nozzle diameter of 6 mm, is preferably sprayed using a transverse spraying device, preferably airless, under pressure onto the grain layer 12 of the leather so that the plastic dispersion with the heavy compact particles present therein penetrates into the pinholes 18. The density of the compact particles is more than 1.2 g/$cm^3$ and is therefore always higher than the density of the plastic which represents the discontinuous phase of the dispersion. Instead of spraying, manual treatment with a plush pad for filling the pinholes can also be effected.

As a result of the pressureless or virtually pressureless action of the superheated steam, the hollow microspheres can develop optimally in the solidified plastic dispersion which has become softer under the influence of superheated steam.

The advantages of the invention are also clarified in that the full grain side of leathers is buffed, either in order to achieve a better anchoring of a dressing or in order to eliminate indentations in the surface in the form of defects. Both lead to a considerable loss of value because the leathers thus produced are not permitted to be offered as full-grain leathers. According to the invention, grain defects are healed with the foamed bottom coating and a surface is created which has the appearance of the finely buffed grain side of a leather but with full or virtually full retention of the true grain layer. The bottom coating forms in particular the basis for leather having a finely structured or smooth surface.

Leathers having a bottom coating produced according to the invention are suitable in particular for use of an indirect process for the formation of a finish layer on the bottom coating, in which process the thin finish layer preferably having a fine-grain surface is first separately produced on a structured substrate and then bonded to the nubuck-like bottom coating by adhesive bonding.

Expediently, the superheated steam is applied directly without pressure or virtually without pressure to the solidified plastic dispersion, for example via steam outlet nozzles or steam outlet slots, it being possible for the hollow microspheres to form from the compact particles. However, it is also possible to generate the superheated steam indirectly by applying water by means of a spray device to the solidified plastic dispersion or to the flesh side of the leather and then subjecting the leather with the solidified plastic dispersion to a brief heat treatment so that superheated steam forms from the thin water coat in less than 25 sec. In this case, it is possible for the leather, moistened shortly beforehand, in particular on its flesh side, to be brought into contact with a metal plate at more than 90° C. without pressure or with very low pressure of not more than 1 kg/cm$^2$ or to be transported over a heated roll.

Particularly poor areas (belly region), i.e. parts of a cattle hide or parts cut to size, can be treated manually with a plush pad, as can smaller hides in the goat, sheep, kangaroo or pig, because the loose-grained character and the pinholes are completely or virtually completely eliminated thereby after the steam treatment.

The invention claimed is:

1. A process for applying a coating, to at least one side, optionally to both sides, of a leather comprising applying the coating of leather having a grain side and a flesh side opposite the grain side, or to one or both sides of a split leather, wherein an aqueous plastic dispersion having compact particles containing a blowing agent is applied in thin layers between 0.015 mm to 0.08 mm to the side or sides to be treated and solidifying the aqueous plastic dispersion, wherein, hollow microspheres are formed from the thermoplastic compact particles by supplying heat, and wherein, after solidification, the plastic dispersion containing the compact particles is subjected to the action of expanded superheated steam at a temperature between 80° C. and 100° C.

2. The process according to claim 1, wherein superheated steam having a pressure of less than 0.1 bar acts on the plastic dispersion.

3. The process according to claim 1, wherein superheated steam acts on the plastic dispersion in a period of less than 7 seconds.

4. An apparatus for applying a coating to at least one side, optionally to both sides, of a leather, optionally to the grain side and/or to the flesh side of a grain leather, or to one or both sides of a split leather, comprising an application device for applying an aqueous plastic dispersion having compact particles containing a blowing agent in thin layers between 0.015 mm to 0.08 mm to the side or sides of the leather to be treated, and comprising a heat source acting on the applied plastic dispersion and producing solidification thereof and expansion of the compact particles for the formation of hollow microspheres, the apparatus further comprising a superheated steam feeding device for acting on the solidified plastic dispersion.

5. The apparatus according to claim 4, wherein the superheated steam feeding device has at least one superheated steam line having outlets nozzles or outlet slots directed towards the solidified plastic dispersion.

6. The apparatus according to claim 5, wherein the superheated steam line comprises a tube having a round or polygonal cross section.

7. The apparatus according to claim 6, wherein the tube has a zigzag form and is connected to at least one end to a superheated steam source.

8. The apparatus according to claim 4, wherein the superheated steam feeding device has a superheated steam container which encloses a transport device and is connected to a superheated steam source.

9. The apparatus according to claim 4, wherein the superheated steam feeding device is arranged adjacent to a revolving transport device, supporting the leather provided with the solidified plastic dispersion.

10. The apparatus according to claim 9, wherein the transport device comprises of a plurality of parallel, revolving plastic filaments, a distance apart.

11. The apparatus according to claim 4, wherein a warm air channel enclosing the transport device is provided in the direction of revolution of the transport device, before and optionally also behind the superheated steam feeding device.

12. Leather produced by a process according to claim 1, wherein the surface of the coating which is treated with expanded superheated steam has a homogeneous, nubuck, indentation-free appearance.

13. The process according to claim 3, wherein superheated steam acts on the plastic dispersion in a period of less than 3 seconds.

* * * * *